US012173655B2

(12) United States Patent
Fetvedt et al.

(10) Patent No.: US 12,173,655 B2
(45) Date of Patent: Dec. 24, 2024

(54) FLAME CONTROL IN AN OXYFUEL COMBUSTION PROCESS

(71) Applicant: 8 Rivers Capital, LLC, Durham, NC (US)

(72) Inventors: Jeremy Eron Fetvedt, Raleigh, NC (US); Brock Alan Forrest, Durham, NC (US); Scott Thomas Martin, Durham, NC (US); Xijia Lu, Durham, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 25 days.

(21) Appl. No.: 17/638,061

(22) PCT Filed: Aug. 26, 2020

(86) PCT No.: PCT/IB2020/057987
§ 371 (c)(1),
(2) Date: Feb. 24, 2022

(87) PCT Pub. No.: WO2021/038470
PCT Pub. Date: Mar. 4, 2021

(65) Prior Publication Data
US 2022/0275759 A1 Sep. 1, 2022

Related U.S. Application Data

(60) Provisional application No. 62/891,590, filed on Aug. 26, 2019, provisional application No. 62/891,588, filed on Aug. 26, 2019.

(51) Int. Cl.
*F02C 7/264* (2006.01)
*F23C 7/00* (2006.01)
(Continued)

(52) U.S. Cl.
CPC ............. *F02C 7/264* (2013.01); *F23C 7/00* (2013.01); *F23L 7/00* (2013.01); *F23L 15/00* (2013.01);
(Continued)

(58) Field of Classification Search
CPC ..... F02C 7/264; F23C 7/00; F23L 7/00; F23L 15/00; F23L 2900/00001;
(Continued)

(56) References Cited

U.S. PATENT DOCUMENTS 4,047,877 A * 9/1977 Flanagan ............... F23C 13/00
60/749
4,722,182 A 2/1988 Brännström
(Continued)

FOREIGN PATENT DOCUMENTS

CA 2241986 7/1997
CN 201184694 1/2009
(Continued)

OTHER PUBLICATIONS

Rasmussen et al., "Sensitizing Effects of NOx on CH4 Oxidation at High Pressure," *Combustion and Flame*, 2008, pp. 529-545, vol. 154.

*Primary Examiner* — Craig Kim
(74) *Attorney, Agent, or Firm* — Womble Bond Dickinson (US) LLP (57) ABSTRACT

The present disclosure provides for improving flame propagation in a combustor, particularly in a combustor for use in a power production system and method. At least one stream being passed into the combustor (e.g., a fuel, an oxidant, a diluent, a coolant, a working fluid, water, or steam) can be independently heated to a temperature that is about the autoignition temperature of the fuel or greater. Further, flame stabilization, including promoting ignition, can be improved (Continued)

as described herein through controlled addition of one or more NOx species into the combustor or combustion chamber.

25 Claims, 4 Drawing Sheets

(51) Int. Cl.
*F23L 7/00* (2006.01)
*F23L 15/00* (2006.01)

(52) U.S. Cl.
CPC . *F05D 2240/35* (2013.01); *F23L 2900/00001* (2013.01); *F23L 2900/07008* (2013.01); *F23L 2900/07009* (2013.01)

(58) Field of Classification Search
CPC .. F23L 2900/07008; F23L 2900/07009; F05D 2240/35
See application file for complete search history.

(56) References Cited

U.S. PATENT DOCUMENTS

| | | | |
|---|---|---|---|
| 6,269,882 B1 | 8/2001 | Wellington et al. | |
| 11,668,460 B2 * | 6/2023 | Robertson | F23C 7/00 431/2 |
| 11,668,466 B2 * | 6/2023 | Chon | F23R 3/286 60/722 |
| 2004/0197718 A1 * | 10/2004 | Deshpande | F23C 13/00 431/2 |
| 2005/0000220 A1 * | 1/2005 | Zauderer | B01D 53/56 60/39.55 |
| 2005/0120717 A1 * | 6/2005 | Sprouse | F23R 3/40 60/776 |
| 2005/0160717 A1 * | 7/2005 | Sprouse | F02C 7/264 60/39.821 |
| 2017/0363005 A1 * | 12/2017 | Freidl | F02C 7/1435 |

FOREIGN PATENT DOCUMENTS

| | | | | |
|---|---|---|---|---|
| CN | 115341963 A | * | 11/2022 | |
| DE | 102021004141 A1 | * | 10/2022 | F02C 7/264 |
| EP | 3604928 B1 | * | 3/2023 | F02C 3/22 |
| JP | H02154913 | | 6/1990 | |
| JP | H05126316 | | 5/1993 | |
| JP | 2005265298 | | 9/2005 | |
| JP | 2011021791 | | 2/2011 | |
| JP | 201237232 A | | 2/2012 | |
| JP | 2012181003 | | 9/2012 | |
| JP | 2013019666 A | | 1/2013 | |
| WO | WO 2009/014980 | | 1/2009 | |

* cited by examiner

FLAME CONTROL IN AN OXYFUEL COMBUSTION PROCESS

CROSS-REFERENCE TO RELATED APPLICATIONS

The present application is a U.S. National Stage of International Patent Application PCT/IB2020/057987, filed Aug. 26, 2020, and claims priority to U.S. Provisional Patent Application Nos. 62/891,590, filed Aug. 26, 2019 and 62/891,588, filed Aug. 26, 2019. The disclosures of each of the applications noted above are incorporated herein by reference in their entirety.

FIELD OF THE DISCLOSURE

The present disclosure relates to flame control in an oxyfuel combustion process. More particularly, the disclosure provides systems and methods for oxyfuel combustion for power production.

BACKGROUND

In oxy-combustion cycles it is desirable to promote and maintain ignition before the temperatures and pressures throughout the system have been elevated to a point where the flame within the combustor can be easily sustained. Thus, until the combustor reaches at least the necessary temperature, a flame can be highly unstable. Further, once ignition is achieved, the flame must remain lit through system transients, which may involve periods of extended operation at low temperature. At these low temperatures, it can be difficult to maintain the flame without suffering a blowout.

Various methods have been considered for ignition in a combustor. Spark ignitors have been used in gas turbines, but the suitability of such elements in high pressure oxyfuel systems is questionable since the spark ignitor itself is believed to be susceptible to failure at high pressure, which may cause damage to the power cycle due to liberation of parts into the cycle. It is also known to use spark ignitors only during the initial startup stages of a conventional gas turbine such that the ignitor is withdrawn from the combustor after ignition. Meanwhile, in some aircraft combustors, it is known that a continuous ignitor operation is used to resist risk of blowout or increase the likelihood of relight in the event of blowout. The added complexity of implementing such solution with a high pressure oxyfuel combustion system, however, makes it impractical. Laser ignition systems have recently gained popularity in known combustion systems, but there are potential problems with placement of the device and the power that must be provided to the laser in order to initiate ignition. In addition, the laser requires an optical pathway to the center of the combustion chamber, and this can lead to complexity and potential failure points through the use of options, such as sapphire windows. Still further, hypergolic chemicals have been used in testing rocket motors and, while energetic in providing ignition, the products of the chemical reaction are solids, which are not acceptable for use in closed power cycles where the solids may foul the combustor itself, the turbine, and/or the heat exchangers. In systems utilizing air as the oxidant in a combustion turbine, it is recognized that the presence of NOx species can be useful to promote the combustion process. Due to regulations around NOx emissions, however, it remains unfavorable to purposefully add NOx species to a combustion process which emits to the atmosphere. These known, potential ignition sources are insufficient for use in many cases related to the present issue also because they only address the point in space within the combustor at which ignition occurs and do not address the overall flow parameters entering the combustor. Improving or conditioning the bulk flowrates entering the combustor as well as other overall factors related to the startup of the system can have positive effects on multiple processes, including combustion. For example, in many instances it is desired to maintain flame while also bringing the rest of the plant up in process and temperature at a significantly slow rate, much slower than the change in temperature witnessed at ignition. Such cases require more robust an encompassing solutions beyond the mere provision of an ignition spark.

In addition to the foregoing considerations, it is very common in chemical reactions to add additional catalysis to ensure that a reaction is continually progressed and to lower the energy hurdle to initiate a reaction. This can be further accomplished through inclusion of a solid catalyst or promoter in the region of the reaction or by providing an additional stream of the catalyst or promotor in a continuous process that flows freely in the process stream. To this end, as noted above, it has been found previously that the addition of NOx can promote combustion in flames utilizing air as the oxidant, but regulations on NOx emissions and the significant requirements to prevent such emissions make this an impractical solution. Accordingly, there remains a need in the art for improved combustion processes and systems that promote starting and/or maintaining an oxyfuel combustion process.

SUMMARY OF THE DISCLOSURE

The present disclosure provides for systems and methods suitable for improving start-up and sustained operation of a power plant. The present systems and methods may be implemented with a variety of power production cycles and can be particularly beneficial for use with oxyfuel combustion cycles intended for high pressure operation.

In one or more embodiments, the present disclosure can provide methods for propagating flame in a combustor of a power production plant. Propagating flame, or flame propagation, as used herein, can refer to actions and/or components that are utilized to improve the ability to initially ignite a flame, such as during start-up of a power production plant, to improve the ability to re-ignite a flame after a blowout, and/or to maintain a flame and avoid a blowout, such as during operations when combustor temperature is below normal operating conditions and/or power output of the power production plant are below normal operations (e.g., during a transient period). Periods of operation below normal operating parameters can be defined as operating with a combustor temperature that is less than 90%, less than 80%, less than 75%, less than 60%, or less than 50% of the typical temperature at which the power production plant will be operated for normal power output. Similarly, a transient period may be defined as operating of the power production plant with a power output that is less than 90%, less than 80%, less than 75%, less than 60%, or less than 50% of the power output from the power production plant when operated under normal conditions. In such conditions, the flame in the combustor may be more susceptible to blowout, and flame ignition may be made more difficult under such conditions. The present disclosure thus provides methods and systems that improve flame propagation as evidenced by eased flame ignition or re-ignition and/or as evidenced by improving resistance to blowout.

In some embodiments, methods according to the present disclosure can comprise: inputting to a combustor a fuel having a defined autoignition temperature; further inputting to the combustor at least one non-fuel stream; and heating the at least one non-fuel stream sufficiently such that a total flow of streams entering the combustor is at a temperature that is greater than the autoignition temperature of the fuel or is below the autoignition temperature of the fuel by no more than 20%; wherein heating the at least one non-fuel stream is carried out utilizing heat that is not derived from combustion. In one or more embodiments, the methods can be further defined in relation to one or more of the following statements, which can be combined in any number and order.

The method can be implemented at start-up of the power production plant or during a transient period in operation of the power production plant.

The start-up of the power production plant or the transient period in operation of the power production plant can be defined in relation to the power production plant operating at a power output that is less than 75% of a normal operating power output.

The non-fuel stream can be one or more of an oxidant stream, a working fluid stream, a diluent stream, and a water/steam stream.

The heating of the at least one non-fuel stream can comprise heating at least a portion of a line through which the non-fuel stream flows to the combustor using one or more line heaters.

The one or more line heaters can be configured to receive a heated stream for transfer of heat therefrom to the line.

The heating of the at least one non-fuel stream can comprise directly heating the at least one non-fuel stream.

Directly heating the at least one non-fuel stream can comprise compressing the at least one non-fuel stream.

The heating of the at least one non-fuel stream can comprise passing the at least one non-fuel stream through a heat exchanger against a separately heated stream.

The at least one non-fuel stream can be input to the combustor through a line that includes a branch line that is isolatable from the line.

The heating of the at least one non-fuel stream can comprise heating at least a portion of the branch line.

The branch line can be isolatable from the line utilizing one or more valves that selectively allow or disallow flow of the at least one non-fuel stream through the branch line.

The method further can comprise controllably operating a heating component present within the combustor or a combustion chamber thereof.

The heating component can be controlled so when the total flow of streams entering the combustor is at a temperature that is below the autoignition temperature of the fuel, the heating component is effective to add sufficient heat so that an overall temperature in the combustor or the combustion chamber is equal to or greater than the autoignition temperature of the fuel.

The method further can comprise inputting a chemical catalyst comprising at least one NOx species into the combustor in an amount sufficient to reduce an activation energy level necessary to achieve or maintain flame in the combustor or a combustion chamber thereof.

In one or more embodiments, the present disclosure can provide a power production plant. Such plant can be configured to exhibit improved control over flame propagation as otherwise described herein. For example, the power plant can comprising: a combustor; a fuel line configured for input to the combustor of a fuel having a defined autoignition temperature; at least one input line configured to deliver to the combustor at least one non-fuel stream; a turbine in fluid communication with the combustor; and at least one heater operably arranged with the at least one input line to heat the at least one non-fuel stream sufficiently such a total flow of streams entering the combustor is at a temperature that is equal to or greater than the autoignition temperature of the fuel or is below the autoignition temperature of the fuel by no more than 20%. In further embodiments, the power production plant can be defined in relation to one or more of the following statements, which can be combined in any number and order.

The combustor further can include a heating component positioned within the combustor or within a combustion chamber thereof.

The heating component can be configured to provide heating to the combustor or the combustion chamber that is independent of heating from the total flow of streams entering the combustor.

The heating component can be a resistive heater.

The heating component can be controllable so when the total flow of streams entering the combustor is at a temperature that is below the autoignition temperature of the fuel, the heating component is effective to add sufficient heat so that an overall temperature in the combustor is greater than the autoignition temperature of the fuel.

The at least one heater can be a line heater.

The in the line heater can be configured to receive a heated stream for transfer of heat therefrom to the line.

The at least one heater can comprise a compressor.

The at least one heater can comprise a heat exchanger through which the at least one non-fuel stream is heatable against a heated stream.

The at least one input line further can include a branch line that is isolatable from the at least one input line, and wherein the at least one heater is positioned on the branch line.

The branch line can be isolatable from the at least one input line utilizing one or more valves that selectively allow or disallow flow of the at least one non-fuel stream through the branch line.

In one or more embodiments, a method for propagating flame in a combustor of a power production plant can comprise: inputting a fuel into a combustor; inputting an oxidant into the combustor; and inputting a chemical catalyst comprising at least one NOx species into the combustor in an amount sufficient to reduce an activation energy level necessary to achieve or maintain flame in the combustor or a combustion chamber thereof. In further embodiments, such methods can be further defined in relation to one or more of the following statements, which can be combined in any number and order.

The chemical catalyst comprising at least one NOx species can be input to the combustor in combination with one or both of the fuel and the oxidant.

The method further can comprise reacting at least ammonia in a reactor to generate the at least one NOx species.

The inputting of the chemical catalyst comprising at least one NOx species can be substantially continuous during operation of the power production plant, and wherein the method further can comprise adjusting a content of the chemical catalyst comprising the at least one NOx species based upon a change in one or more further operating parameters of the power production plant.

The inputting of the chemical catalyst comprising at least one NOx species can be carried out until a defined threshold is reached.

The defined threshold can be a combustor operating temperature or a power output of the power production plant.

The chemical catalyst comprising at least one NOx species can be input in an amount sufficient such that an amount of the at least one NOx species present in an exhaust flow out of the combustor is about 5 ppm to about 1000 ppm.

A power production plant according to the present disclosure can comprise: a combustor; a turbine or expander in fluid communication with the combustor and arranged to receive an exhaust from the combustor; and a plurality of lines configured for input of at least a fuel, an oxidant, and a chemical catalyst comprising at least one NOx species into the combustor. In further embodiments, the power production plant further can comprise a reactor configured to receive at least ammonia and output a stream comprising the at least one NOx species.

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

In one or more embodiments the present disclosure relates to systems and methods for improving operation of at least a combustor that is configured for operation in a power production system. Such system can be particularly configured for carrying out an oxyfuel combustion cycle, and the disclosed systems and methods can be particularly useful for improving operation of the system for power production. As non-limiting example embodiments, the present disclosure can be effective for promoting one or more of ignition, combustion, and flame stability within a combustor, particularly within a combustor in said power production system. In addition, the present disclosure can be effective in maintaining appropriate bulk temperatures at various regions of a facility, in the moments before and after ignition of the combustor. In some embodiments, the improvements described herein can be particularly implemented when the power production system, and specifically the combustor, is being operated at startup and/or at any time wherein the combustor is operated at a temperature that is less than a normal operation temperature.

A normal operation temperature as used herein particularly means a temperature (±10%) at which the combustor is typically operated when the power production is working at full power production. For example, an oxyfuel combustion process, such as described in U.S. Pat. No. 8,596,075, the disclosure of which is incorporated herein by reference, may have a normal operation temperature of around 800° C. As such, a normal operation temperature, depending upon the specific construction of the power production system, may be in the range of about 600° C. to about 1,000° C., or about 600° C. to about 900° C., although such temperature range is not intended to be limiting of the ability to implement the various embodiments disclosed herein. Furthermore, the exact temperatures chosen will be a matter of the expected autoignition temperature range of the fuel, as well as the desired inlet conditions to downstream conditions. It is important to recognize, however, that the normal operating temperature is not immediately achieved upon startup of a power production plant. Rather, an operating power production cycle must be brought up from ambient temperature to the normal operating temperature. Likewise, in some instances, it can be desirable to reduce the cycle temperature significantly below the normal operating temperature without complete shutdown of the cycle in order to carry out maintenance or for other reasons. Such time of reduced operating temperature may be known as a transient period.

As noted above, at startup, it can be difficult to achieve a stable flame within the combustor or, more specifically, within a combustion chamber. Moreover, when the cycle temperature is reduced during a transient period, the flame again may become unstable. The present disclosure improves the ability to achieve startup of the combustor and/or improves the ability to maintain a stable combustor flame during a period of reduced operation temperature through implementation of one or more features that are further described herein. As such, the present disclosure specifically relates to propagating flame in a combustor of a power production plant when the power production plant is in start-up or when the power production plant is operating below normal operating conditions (e.g., combustor temperature and/or plant power output).

As already noted, the present disclosure provides improvements that can be implemented with existing power production systems and methods, or future systems and methods, that utilize a combustor, combustion chamber, or similar element wherein a fuel is combusted with an oxidant to form an exhaust stream. The present disclosure can complement such configurations through addition of one or more further components and/or through addition of one or more inputs to the combustion component. When the present disclosure is implemented with an existing power cycle, the further components of the power cycle can remain substantially unchanged.

Figure 1:
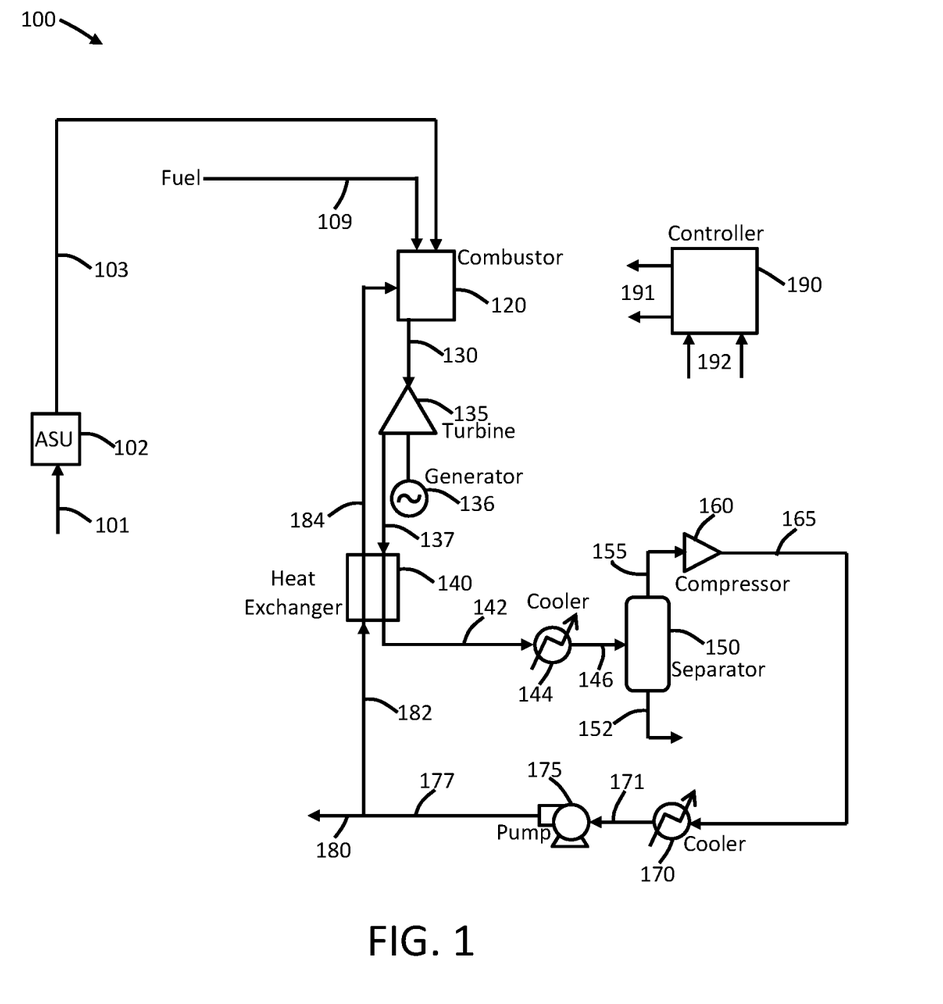
FIG. 1 illustrates a flow diagram of a power production plant configured for implementation of one or more functions and/or components as described herein for propagating flame in a combustor thereof according to example embodiments of the present disclosure.

An example power production plant 100 suitable for carrying out a power production process according to the present disclosure is illustrated in FIG. 1. As seen therein, a combustor 120 is configured for receipt of fuel through line 109, oxidant through line 103, and diluent through line 184. The oxidant may be an air stream and/or substantially pure oxygen that can be formed, for example, using an air separation unit 102 suitable for forming the oxygen from an air stream 101. The air separation unit 102 can include the necessary compression equipment to provide the oxidant at the desired pressure, or a separate compressor may be provided in-line between the air separation unit 102 and the combustor 120. Likewise, if desired, an optional compressor may be present in connection with fuel line 109 to compress the fuel to a desired pressure prior to entry to the combustor 120. The diluent may be any suitable material, such as water (e.g., steam), carbon dioxide, or the like. As illustrated, a recycled carbon dioxide stream is passed through line 184 to the combustor 120 to function as the diluent stream. In some embodiments, a portion of the recycled carbon dioxide stream from line 184 can be withdrawn and combined with the oxidant stream in line 103 to form a diluted oxidant stream having a desired $O_2/CO_2$ ratio.

The fuel is combusted with oxygen in the combustor 120 for forming a combustor exhaust stream 130 that is passed through a turbine 135 or other expander where it is expanded to produce power in generator 136. A turbine exhaust stream 137 is passed through a heat exchanger 140 where it is cooled to form stream 142, which is further cooled to near ambient temperature in a cooler 144. The cooled turbine exhaust stream 146 is then processed in a water separator 150 to provide a water stream 152 (which may include some content of nitric acid and/or sulfuric acid if SOx and/or NOx species are present in the exhaust stream 130 from the fuel or any additive that may be added to the combustor 120. A substantially pure carbon dioxide stream 155 leaves the separator 150 and is compressed in a compressor 160 to form an intermediate compressed stream 165. The intermediate compressed stream 165 is cooled in a cooler 170 to increase the density of the carbon dioxide and form an increased density carbon dioxide stream 171, which is pumped in pump 175 to a high pressure for input to the combustor 120. A carbon dioxide product stream 180 can be withdrawn from the high pressure carbon dioxide stream 177 to leave a carbon dioxide recycle stream 182 that is passed back though the heat exchanger 140 to be heated against the turbine exhaust stream 137. The heated recycle carbon dioxide stream 184 is then routed back to the combustor 120 for use as a diluent. A control unit 190 may be included with the power production plant 100 and may be configured to receive one or more inputs 192 and provide one or more outputs 191 that can be effective to provide automated control of one or more features of the power production plant.

During normal operations, the combustor 120 may be operated at a significantly high temperature so that flame stability is maintained, and problems such as blowouts are not routinely encountered. During startup or transient periods, however, ignition and/or flame ignition can be difficult to achieve or maintain.

In one or more embodiments, such problem(s) can be addressed through inclusion of one or more line heaters of appropriate size and heat production capacity at one or more points in the power production plant. During operation, the heater(s) can be used to raise the temperature of the stream (s) in one or more lines to above the autoignition point of the fuel that is being combusted in the combustor such that a separate source of ignition is not needed. For example, the autoignition temperature of substantially pure methane is approximately 600° C., and such temperature may be achieved by a wide variety of heating technologies, including recuperated heating, combustion heating, mechanical heating (e.g., heat of compression), and the like. Thus, the fuel will spontaneously ignite in the combustor or combustion chamber when in the presence of the oxidant when the appropriate temperature is achieved. Keeping above the autoignition point of the fuel imparts flame stability that otherwise must be achieved aerodynamically, and this would not be otherwise possible if the cycle pressure and temperature are too low. Heating therefore can be applied in order to achieve a target temperature within the combustor and/or combustion chamber. Such target temperature typically will be greater than the autoignition temperature of the fuel being combusted and, for example, can be at least 2%, at least 5%, at least 10%, at least 20%, or at least 25% greater than the autoignition temperature of the fuel. Although not required, heating may be limited so that the target temperature is no more than 100% greater than the autoignition temperature of the fuel. For example, the target temperature can be about 2% to about 75%, about 3% to about 60%, about 4% to about 50%, or about 5% to about 25% greater than the autoignition temperature of the fuel. In some embodiments, such target temperature may refer to a temperature within the combustor or combustion chamber. In other embodiments, such target temperature may refer to a temperature of a stream passed to the combustor through an input line (e.g., the stream temperature being measured immediately upstream from the combustor).

In some embodiments, heating can be applied to at least one non-fuel stream such that a total flow of streams entering the combustor is at a temperature that is greater than the autoignition temperature of the fuel or is below the autoignition temperature of the fuel by no more than 20%. When the temperature of the total flow of streams entering the combustor is greater than the autoignition temperature of the fuel, flame can be propagated with greater ease, and blowout can be avoided. In some embodiments, it is possible to operate according to the present disclosure, however, when the temperature of the total flow of streams entering the combustor is less than the autoignition temperature of the fuel provided that additional actions are likewise carried out to otherwise increase the activation energy in the combustor or combustion chamber. For example, as further described herein, a chemical catalyst may be input to the combustor and/or a heating component may be included directly in the combustor or the combustion chamber. In such embodiments, operation may be carried out wherein the total flow of streams entering the combustor is at a temperature that is below the autoignition temperature of the fuel by no more than 20%, by no more than 15%, by no more than 10%, or by no more than 5%. Such ranges can allow for the heating in the combustor to be sufficient such that the additive methods for improving activation energy can overcome the shortfall of the heated stream(s) entering the combustor.

Figure 2:
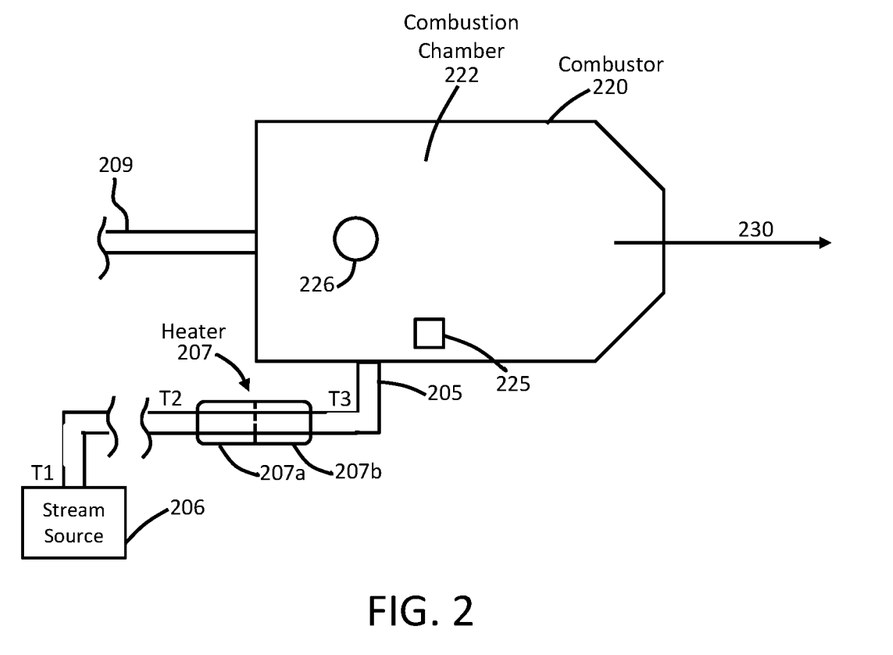
FIG. 2 illustrates a combustor and associated components for use in systems and methods for propagating flame according to example embodiments of the present disclosure.

Heating of one or more streams being passed to the combustor/combustion chamber can be carried out in a variety of manners. In some embodiments, one or more heaters can be placed in communication with one or more input lines to the combustor or combustion chamber. For example, FIG. 2 illustrates a combustor 220 including a combustion chamber 222 configured to receive at least a fuel through fuel line 209. An input line 205 is further illustrated, and input line 205 can be for input of any further material from a stream source 206. The stream passing from stream source 206 through line 205 can comprise any material that may be required for combustion of the fuel and/or useful for managing combustion and/or useful for providing a material to the exhaust stream 230 exiting the combustor 220. Such material may be referenced as a non-fuel stream to delineate from the fuel stream. Further, while only one input line 205 is shown in FIG. 2, it is understood that, including the fuel line 209, the combustor 220 may include two, three, four, five, or even more input lines. Any number of the input lines may be heated as further described herein. Likewise, any input line for providing a material as described herein to the combustor 220 may be expressly excluded from added heating.

The following are example embodiments of materials that may be provided individually or in any combination through an input line 205 (which may be heated in one or more manners as otherwise described herein) to the combustor 220: an oxidant stream; a fuel stream; a diluent stream; a working fluid stream; a coolant stream; and/or a water or steam stream. In some embodiments, a combustor 220 may be configured to include a fuel line, an oxidant line, and a working fluid line, wherein one or more of the stated lines is heated as described herein. In some embodiments, a combustor 220 may be configured to include a fuel line, an oxidant line, and a diluent line, wherein one or more of the stated lines is heated as described herein. In some embodiments, a combustor 220 may be configured to include a fuel line, an oxidant line, and a coolant line, wherein one or more of the stated lines is heated as described herein. In some embodiments, a combustor 220 may be configured to include a fuel line, an oxidant line, and a water/steam line, wherein one or more of the stated lines is heated as described herein. In some embodiments, a combustor 220 may be configured to include a fuel line, an oxidant line, a working fluid line, and a diluent line, wherein one or more of the stated lines is heated as described herein. In some embodiments, a combustor 220 may be configured to include a fuel line, an oxidant line, a working fluid line, and a coolant line, wherein one or more of the stated lines is heated as described herein. In some embodiments, a combustor 220 may be configured to include a fuel line, an oxidant line, a working fluid line, and a water/steam line, wherein one or more of the stated lines is heated as described herein. In some embodiments, a combustor 220 may be configured to include a fuel line, an oxidant line, a diluent line, and a coolant line, wherein one or more of the stated lines is heated as described herein. In some embodiments, a combustor 220 may be configured to include a fuel line, an oxidant line, a diluent line, and a water/steam line, wherein one or more of the stated lines is heated as described herein. In some embodiments, a combustor 220 may be configured to include a fuel line, an oxidant line, a coolant line, and a water/steam line, wherein one or more of the stated lines is heated as described herein.

In some embodiments, the heated stream may specifically comprise one or both of oxygen and carbon dioxide. When an oxidant stream is heated, the temperature to which the oxidant is heated may be varied as required in order to improve reactivity as a function of oxidative potential, which includes the partial pressure of the oxygen. The amount of fuel, and therefore oxidant, may also be influenced by residual oxygen or oxidative compounds that could exist in the recycle flow should they directly interact with the flame zone or adjacent combustion activities.

As seen in FIG. 2, a line heater 207 is associated with input line 205 to provide heating effective to heat the stream passing through the input line to a temperature that exceeds the autoignition temperature of the fuel that is input to the combustor in line 209. The line heater 207 may be a single heater or may be provided as a plurality of heaters (207a, 207b). While two heaters (207a, 207b) are illustrated in FIG. 2, it is understood that any number of heaters may be used as needed on a single input line, and individual heaters (even on the same input line) may utilize the same heat source and/or type of heating or may use different heat sources and/or heating types.

Figure 3:
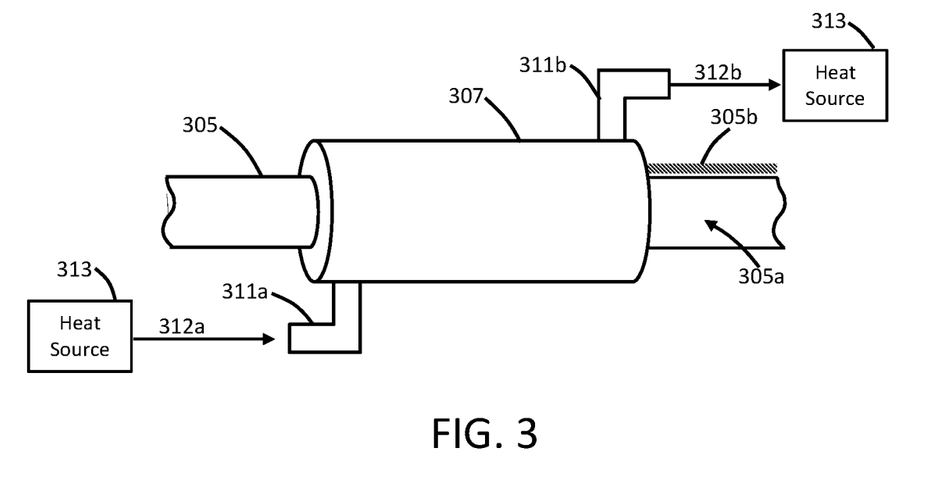
FIG. 3 illustrates a portion of an input line and a line heater for use in systems and methods according to example embodiments of the present disclosure.

In one or more embodiments, one or more line heater(s) utilized for heating one or more input lines may be configured to heat the line itself. For example, FIG. 3 illustrates a portion of an input line 305 for input of a stream to a combustor, and the input line includes a line heater 307 that is configured to wrap, encircle, or encompass at least a portion of an exterior surface 305a of the wall defining the input line. The input line 305 will typically be configured as a tube or similar piping with an outer wall formed of a metal (e.g., stainless steel) or similar material suitable for operation under temperature and pressure conditions required for an input line in a power production plant. As such materials are typically reasonably good conductors of heat, the line heater 307 being in direct contact with the exterior surface 305a of the input line can be effective to transfer heat through the wall defining the line to thereby heat the stream passing through the interior space of the line. As such, it can be beneficial for the input line 305 to include one or more insulation layer 305b along at least a portion of any part of the input line that is between the line heater 307 and the combustor 220. Thus, heating that is transferred to the material passed therethrough, will be maintained within the stream until input of the stream to the combustor. A line heater configured to be in direct contact with a surface of the input line wall so as to transfer heat to the stream through the line wall can be associated with the particular input line along a defined length of the input line. For example, referring to FIG. 2, an input line 205 can have a total length measured as the length between the stream source 206 and the combustor 220. In various embodiments, the line heater (207, 307) may be present along anywhere from about 1% to about 99% of the total length of the particular input line. The specific relative length can depend in some embodiments on the nature of the heat source that is used. For example, when a high grade heat source is used, the line heater (207, 307) may encompass about 5% to about 60%, about 5% to about 50%, about 10% to about 40%, or about 15% to about 35% of the total length of the input line (205, 305). When a low grade heat source is used, the line heater (207, 307) may encompass about 25% to about 95%, about 25% to about 90%, about 30% to about 80%, or about 35% to about 75% of the total length of the input line (205, 305).

A high grade heat source may be a heat source providing heat at a temperature that is equal to or greater than (e.g., at least 5%, at least 10%, at least 20%, or at least 30% greater than) the target temperature. A low grade heat source may be a heat source providing heat at a temperature that is less than the target temperature (e.g., preferably within 50%, within 30%, within 20%, or within 10% of the target temperature). The target temperature will be as already described above, and may be referenced to a desired temperature within the combustor or may be referenced to a desired stream temperature within an input line. In some embodiments, such as wherein a plurality of different input lines are being separately heated, it may be desirable to heat the respective streams to different target temperatures. For example, when an oxidant line and a diluent line are being utilized, it may be desirable to heat the diluent line to a greater temperature than the oxidant line. Heating may also be varied based upon the total mass flow through a given line, and an input line providing a greater mass flow may be heated to a different target temperature than a separate input line providing a lesser mass flow so that the temperature within the combustor is regulated appropriately such that the temperature within the combustor or combustion chamber exceeds the autoignition point of the fuel. As such, first, second, third, or more streams may be heated to respective first, second, third, or more target temperatures so that a combustor target temperature may be appropriately reached based upon the respective temperatures of the streams, the relative mass flows of the streams, and similar factors that would be recognized by a person of skill in the field. Such variability can allow for utilization of different sources of heat for heating the individual input lines to suitable target temperatures to achieve a combustor target temperature that exceeds the autoignition temperature of the fuel.

Returning to FIG. 3, the line heater 307 may be any type of heater suitable for providing the desired heating to the input line. As illustrated, the line heater 307 can be configured as a circulating heating jacket with a heating fluid inlet 311a and a heating fluid outlet 311b so that a high temperature heat transfer fluid 312a may be received from a heat source 313, and the heat-depleted heat transfer fluid 312b can be recirculated back to said heat source for re-heating. The heat source 313 can be any component or unit effective to generate heat in the desired temperature range. For example, referring to FIG. 1, the ASU 102, the heat exchanger 140, the compressor 160, and the coolers (144, 170) each may be suitable for generating heating that may be captured with a heat transfer fluid for transfer to the input line heater (207, 307). The ASU, for example, may include one or more compressors used to compress air, which can generate sufficient heat for transfer to the line heater (207, 307). Likewise, heat may be taken at a variety of temperature ranges from the heat exchanger 140 as needed, and a working fluid (e.g., carbon dioxide) or any typically utilized heat transfer fluid may be utilized as a circulating fluid for transfer of heat to the line heater.

In some embodiments, the heating that is utilized may be applied such that the stream itself is directly heated instead of transferring heat to the stream through the wall of the line. If desired, direct heating of the stream may be used in combination with use of a line heater as discussed above. In such embodiments, lower grade heating thus may be utilized for at least one of the heating units. For example, the stream may be directly heated using a lower grade heat source, then a higher grade heat source may be utilized in a line heater to further heat the stream to the target temperature. By effectively pre-heating with the direct stream heater, the line heater may be smaller and/or require less overall energy to achieve the target stream temperature.

Figure 4A:
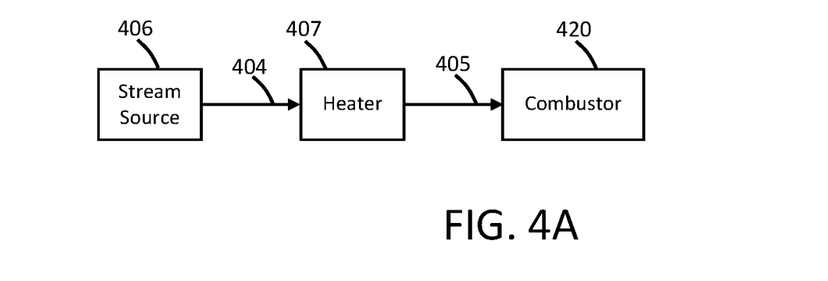
FIG. 4A through FIG. 4C are partial flow diagrams illustrating flow of a stream from a stream source through one or more heaters while being passed to a combustor so that the stream is heated according to example embodiments of the present disclosure.

Use of direct heating is illustrated in FIG. 4A. As seen therein, the stream (e.g., an oxidant, a working fluid, a diluent, or water/steam) may be passed from the stream source 406 through a first stream line 404 to a heater 407, wherein the stream may be directly heated by any suitable method. A heated stream thus exits through a second stream line 405 for input to the combustor 420. As before, the second stream line 405 may include a line heater to provide further heating. Alternatively, or additionally, a line heater may be utilized in association with first line 404 for incremental heating prior to direct heating in the heater 407.

Figure 4B:
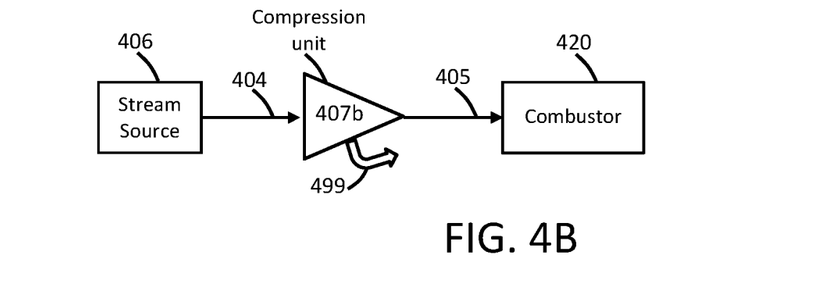
Figure 4C:
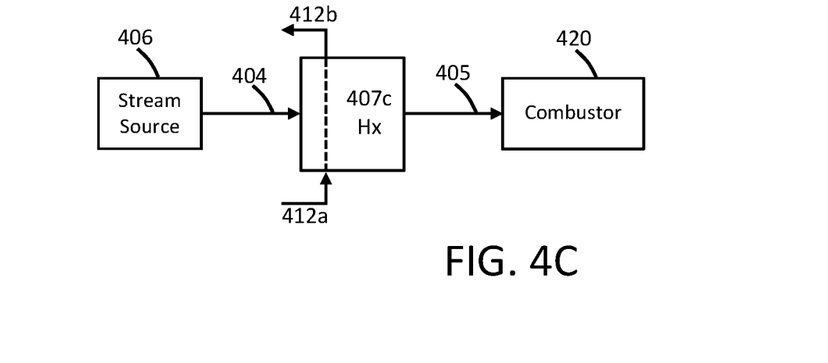

The direct heater 407 may be any component configured for imparting heating to a fluid stream passing therethrough. In an example embodiment, as seen in FIG. 4B, the heater may specifically be a compression unit 407b configured to compress the stream and thereby impart heating thereto. The compression unit 407b may include one compressor or a plurality of compressors. Preferably, the compression unit 407b operates without intercooling so that substantially all heat of compression can be transferred to the stream that is compressed. If compression is effective to increase the temperature of the stream higher than desired, however, intercooling may be utilized, and heat 499 that is drawn off through intercooling may be transferred to another heater in the power production cycle and/or to another stream in the power production cycle to increase efficiency of the overall power production cycle. In another example embodiment, as seen in FIG. 4C, the heater may specifically be a heat exchange unit 407c configured to transfer heat from a higher temperature stream to the stream that is passed from the stream source 406 through the first stream line 404. A high temperature heat transfer fluid 412a may be received from a heat source (see element 313 in FIG. 3), and the heat-depleted heat transfer fluid 412b can be recirculated back to said heat source for re-heating. The heat source again can be any component or unit effective to generate heat in the desired temperature range. The heat exchange unit 407c and the compression unit 407b are illustrative only and should not be viewed as being limiting of the types of heating units that may be utilized. Moreover, the use of one direct heater does not limit the use of another, and combinations of direct heating may be utilized separate from any line heaters or in combination with one or more line heaters.

Heating components utilized for heating a stream as described herein may be configured directly in-line such that flow of the stream through the heating component (or the portion of the input line) is heated using the heating component. In such embodiments, the heaters may be configured to be automatically or manually adjusted during operation. For example, the amount of heat provided by the heater may be adjustable to allow for increasing and/or decreasing heating as needed. Likewise, the heater may be turned off during one or more operational periods as desired. For example, the heater(s) may be operational at a first temperature range during start-up of the power production plant and/or during a transient period to avoid flame-out, and the heater(s) may be gradually or fractionally reduced in heating output over a given time period or may simply be turned off when heating is no longer required, such as when the power production plant is operating under normal conditions. As seen in FIG. 1, a controller 190 may be included in the power production plant 100, and the controller may be configured to provide one or a plurality of outputs 191 based upon receiving one or a plurality of inputs 192. For example, one or more sensors (e.g., temperature, pressure, flow rate, etc.) may be included in the power production plant and can be configured to provide a respective output to the controller 190, which in turn can provide one or more outputs to automatically adjust heating by one or more heaters 207. Similarly, when heating is being applied to multiple streams, the inputs and outputs can be utilized to control heat output by the various heaters and also control flow through the input lines that are directing the streams to the combustor. As illustrated in FIG. 2, temperature sensors T1, T2, T3 may be placed at a variety of locations, such as proximate the stream source 206 or an outlet thereof, upstream from a given heater 207, and downstream of a given heater. Outputs from the controller 190 may thus control opening and closing of one or more valves, splitters, or the like to control mass flow through a given input line and/or to control flow of a heat exchange fluid through a heater, and/or to carry out further operations that can affect temperature in the combustor 220. Further, a temperature sensor 225 or the like may be present in the combustor 220 (or the combustion chamber 222) to ensure that the temperature therein is within the target temperature range.

In some embodiments, the control of the heating may utilize various valves, splitters, and the like to allow for by-pass of one or more heater(s) as needed. This can allow for the use of materials in the heating components that may not necessarily meet one or more requirements for normal operation of the combustor. For example, during start-up, transient periods, or the like, lower pressure operation may be possible. The heater(s) that are needed during such operation may then be provided in an alternate pathway that can be enabled for the lower pressure operation, and the flow can be switched back to the main input line when normal operation is achieved.

Figure 5:
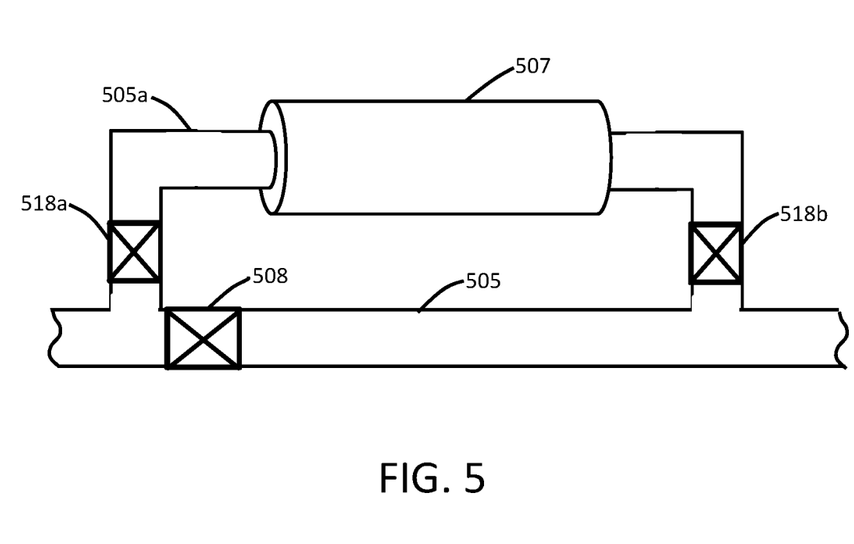
FIG. 5 illustrates a portion of an input line including a branch line with a line heater associated therewith for use in systems and methods according to example embodiments of the present disclosure.

For example, FIG. 5 illustrates a configuration according to some embodiments wherein the input line 505 includes a branch line 505a, and the heater 507 is associated with the branch line. One or more valves can be included so that a stream flowing through the input line 505 may be routed through the branch line 505a. Valve 508 is present in the input line 505, and valves 518a and 518b are present in the branch line 505a upstream and downstream of the heater 507, respectively. It is understood that similar valves or equivalent components may be present anywhere in the power production plant as needed to direct stream flows to the appropriate components. Likewise, any of valves 508, 518a, and 518b (or similar components) may be automatically controlled using one of the output signals 191 from the controller 190, and opening and closing of such valves may depend upon the receipt of a specific input signal 192 to the controller. It is understood that the valves illustrated in the noted figure may likewise be implemented in any embodiment of the present disclosure. For example, the lines 311a and 311b in FIG. 3 for passage of a heat transfer fluid may include valves as needed. Similarly, it is understood that similar lines for passage of a heat transfer fluid are encompassed with the embodiment illustrated in FIG. 5. Control of the heating process also can be achieved using electrical heaters whereby the power provided to the heater is controlled to maintain the desired process setpoint, such as a flow temperature, component temperature, or desired output.

In one or more embodiments, the heat that is utilized for heating of an input stream directed to the combustor can be considered to be external heating or heat that is external to the power production cycle. Such heating can be considered to be external to the power production cycle because the heating that is thusly provided is not directly derived from a combustion stream. Further, such heating can be considered to be additional to the power production cycle because such heating is utilized in addition to the heat provided by the combustion of the fuel in the combustor and in addition to the heat that can be transferred from the recuperative heat exchanger(s). Of course, if desired, the heating (at least in part) specifically can utilize internal heating. For example, referring to FIG. 4C, the heat exchanger 407c may be the same as or part of the heat exchanger 140 from the power production cycle, or the stream that is input through line 412a to the heat exchanger 407c may transfer heat from the heat exchanger 140 from the power production cycle. Accordingly, it can be possible to choose whether to apply internal or external heating or whether to combine heating sources for heating the stream(s) being input to the combustor as presently described herein.

In one or more embodiments, added heating can be supplied directly in the combustor or combustion chamber as an alternative to, or in addition to, the heating methods otherwise described herein. Such heating can be achieved, for example, by providing one or more elements in the combustor or combustion chamber that is/are adapted to or configured to provide constant or substantially constant heating. Preferably, such substantially constant heat source can be externally supplied independent of gas heat transfer. For example, as illustrated in FIG. 1, a heating component 226 is present within the combustor 220 (and, in some embodiments within a combustion chamber 222 thereof). A non-limiting example of such heating component is a resistive coil (e.g., a heat plug or similar component) that can be electrically or otherwise powered and thus can provide heating to the combustor independent of the flux of gas for heat transfer.

When such heating component is present, operation of the power plant, and particularly the combustor, can be carried out such that the heating component is controllably operated. This can include utilization of the controller 190 via the one or more outputs 191 and inputs 192. For example, the heating component 226 can be controlled so when the total flow of streams entering the combustor is at a temperature that is below the autoignition temperature of the fuel, the heating component is effective to add sufficient heat so that an overall temperature in the combustor or the combustion chamber is greater than the autoignition temperature of the fuel. By increasing the temperature directly in the combustor or combustion chamber, the heating component can increase the activation energy needed therein to make up for any shortfall of heating not provided through the heated streams entering the combustor.

As seen from the foregoing, the present disclosure thus provides components and methods of use thereof that are suitable for flame stabilization in a combustor of a power production cycle and/or for improving flame ignition is the combustor. In addition to, or as an alternative to, the preceding disclosure, there are also provided herein components and methods of use thereof that provide similar benefits through addition of one or more chemical species as a catalyst. In particular, the present disclosure provides for the utilization of one or more NOx species to promote flame ignition and/or stabilization in oxy-fuel systems where the NOx species can be provided in low quantities and, preferably, where any exhaust gas can be chemically contacted to remove NOx before discharging of emissions to pipeline or venting.

Combustion in the presence of NOx species can be beneficially promoted via one or more of the pathways shown below.

$$HO_2 + NO = NO_2 + OH \quad (1)$$

$$CH_3OO + NO = CH_3O + NO_2 \quad (2)$$

$$CH_3 + NO_2 = CH_3O + NO \quad (3)$$

In the above reactions, NO only participates in fuel combustion by way of producing intermediate species (OH radicals, $CH_3O$, etc.), and is not consumed during combustion. In this way, NO (nitrous oxide) acts as a gas phase catalyst.

By utilizing NOx species, the present disclosure thus can further address the problem of how to ignite an oxy-fuel combustor that ultimately will be operated at elevated pressures. As noted above, at the substantially low temperatures and/or pressures present during start-up of a combustor or during a transient period, it may be difficult to maintain flame without blowout. By providing an additional catalyst to lower the required ignition kernel energy and to help sustain ignition through lowered reaction potential, the flame can stay lit. Furthermore, the NO or other NOx species can easily be removed at the back end of the power production cycle through various processes, such as the systems and processes disclosed in U.S. Pat. No. 9,919,268 to Allam et al., the disclosure of which is incorporated herein by reference.

According to embodiments of the present disclosure, the ignition process thus can be simplified in several ways. Beneficially, ignition promotion can be improved without the requirement of the addition of expensive equipment that would add significant additional cost to the system and without production of solid soot, which should be avoided in a closed process where there is no way to protect the turbine blades. Such use of NOx as a catalyst can be used in combination with other embodiments disclosed herein or can be used separate therefrom. Moreover, through addition of such gaseous catalyst, it is possible to reduce the amount of heating that may be added as already described above and still improve ignition capability and/or flame stability. As such, the present disclosure serves as a way to reduce the ignitor load and improve its repeatability and then maintain flame stability before temperatures and/or pressures can be increased. Further, other gaseous phase catalysts can be supplied to the flame in this manner by injection to one of the recirculating streams entering the combustor.

In one or more embodiments, the present disclosure thus can encompass controllably injecting a NOx species, such as NO in particular, into a combustor, particularly a combustor in a power production plant. Injection can be carried out at approximately the time of ignition in the combustor and/or during startup of the combustor (e.g., such as before auto ignition temperatures are achieved). Normally, in the case of gas turbines, it is desired to avoid introduction of NO or other NOx species into the gas turbine (i.e. low NOx burners). The present disclosure overcomes this recognized limitation by addition of a NOx species, such as NO, in a controlled manner In some embodiments, controlled addition of NOx to a combustor can be defined in relation to adding only a defined amount of the NOx species to the combustor. For example, the NOx species can be injected to the combustor so that NOx is present in the bulk exhaust flow out of the combustor in a total amount of about 5 ppm to about 1000 ppm, about 10 ppm to about 750 ppm, about 25 ppm to about 500 ppm, about 50 ppm to about 250 ppm, or about 75 ppm to about 150 ppm, based on the mass of the exhaust flow. The NOx species is thus introduced in an amount suitable to lower the required ignition kernel energy and decrease the ignition delay time.

While NOx may be an undesired by-product in power production processes utilizing air as the oxidant, NOx in the present disclosure relates to intentionally added chemical species that chemically present as NOx prior to combustion and is not in fact a combustion by-product resulting from oxidation of nitrogen. In particular, combustion may be carried out such that the flow streams entering the combustor are sufficiently deficient in nitrogen to form NOx in a content presently claimed. Further, since the oxidant may be substantially pure oxygen and may exclude the use of air as the oxidant, it is understood that the NOx species present in the combustor exhaust is NOx that was intentionally added and not a combustion by-product.

Injection of the NOx species into the combustor may be substantially continuous throughout operation of the power production plant. In this manner, the presence of the catalyst material can be effective to reduce the activation energy of the process (e.g., the autoignition temperature of the fuel) and thus reduce the required amount of energy that is needed to achieve and/or maintain the flame in the combustor. Moreover, to the extent that fuel composition may vary during operation of the power production plant, the content of NOx species being injected to the combustor can be changed to substantially equilibrate the combustion. For example, if the oxidant concentration and/or the heating value of the fuel is reduced, the NOx content may be increased to account for the loss of activation energy available. Likewise, if the oxidant concentration and/or the heating value of the fuel is increased, the NOx content may be reduced to account for the increase in available activation energy. Therefore, the NOx may function as a control component that may be automatically adjusted through measurement of downstream parameters (e.g., combustor exhaust flow rate and/or temperature) and/or monitoring of upstream parameters (e.g., the oxidant flow rate, the fuel flow rate, or a known change in fuel chemical makeup).

In further embodiments, injection of the NOx species into the combustor may be carried only for a finite time period. For example, the NOx injection may be carried out until a defined threshold is reached. For example, once the combustor is operating at a defined, minimum temperature, once the power plant has achieved a defined power level, or once the combustor exhaust stream reaches a defined compositional makeup, the NOx injection may be reduced or completely eliminated. Further, monitoring may be carried out to ensure that NOx injection may be increased or re-started if one of the defining parameters falls below the necessary threshold, as this can ensure that a potential blowout may be avoided or may be effective to generally normalize operations of the power plant.

Figure 6:
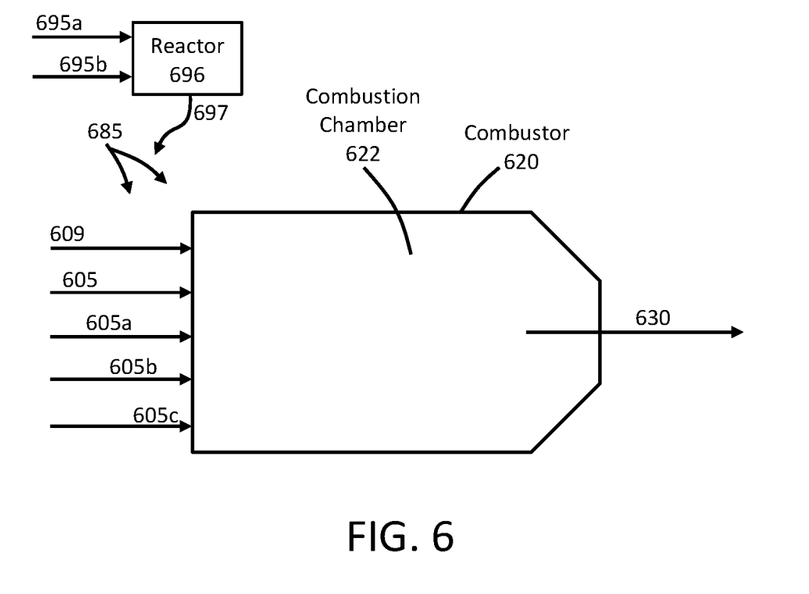
FIG. 6 illustrates a combustor and associated components for use in systems and methods for propagating flame through at least input of a chemical catalyst according to example embodiments of the present disclosure.

An example embodiment of a combustion apparatus suitable for use in a power production plant as described herein is shown in FIG. 6. As seen therein, the combustor 620 can be substantially configured as already discussed in relation to FIG. 1 and/or FIG. 2, and such configurations may be combinable in certain embodiments such that NOx can be injected simultaneously with heating of one or more lines as already described above. In FIG. 6, the combustor 620 includes a combustion chamber 622 and provide an exhaust stream 630. The combustor 620 includes a fuel line 609 for input of fuel and includes one input line 605 or a plurality of input lines (605, 605a, 605b, 605c, etc.) for input of one or more non-fuel streams. One or a plurality of lines 685 for providing one or more streams independently comprising one or more NOx species can likewise be provided. As illustrated, line(s) 685 can be configured to add one or more NOx species to any one or more of the fuel line 609 and any of the lines (605-605c) providing the non-fuel stream(s). Alternatively, or additionally, line(s) 685 can be configured for input of the one or more NOx species directly into the combustor 620, including directly into the combustion chamber 622.

In some embodiments, controlled addition of NOx to a combustor can be defined in relation to a specific chemical pathway. For example, in one or more embodiments, the present disclosure can comprise specifically adding nitrous oxide (NO) via electrocatalytic reduction of ammonia. For example, as illustrated in FIG. 6, a dedicated reactor 696 can be included in the power production plant, and such reactor can be configured to receive the necessary input streams (695a, 695b) to convert the ammonia to NO. At least a portion of the formed NO can be passed through a dedicated line 697 to be utilized as at least a portion of the NOx species passed to the combustor directly and/or to one or more other input lines (609, 605-605c). Through such reaction, the local NO concentration at one or more streams entering the combustor or combustion chamber (e.g., in a gas turbine) can be adjusted as needed to be in the desired range, as otherwise described herein. Streams in lines 695a and 695b can be, for example, ammonia, catalyst, oxidant, or the like as would be useful in carrying out the necessary reactions for the conversion. The reactor 696 may be a heated reactor, if needed.

In some embodiments, controlled addition of NOx to a combustor can be defined in relation to a specific location of the NOx injection. For example, a dedicated NOx injection nozzle can be placed in the combustor or combustion chamber to inject the NOx directly into a fuel and oxidant mixing zone at the designed conditions. In another example embodiment, NOx can be mixed with one or both of a fuel stream and an oxidant stream prior to being injected into the combustor or combustion chamber at the ignition and start up conditions. In further example embodiments, NOx can be injected into one or more recirculating streams entering the combustor or combustion chamber. In particular, NOx may be injected to a plurality of streams being passed into a combustor or combustion chamber and optionally also directly injected into a primary flame zone within the combustor or combustion chamber. In preferred embodiments, NO may be injected as closely as possible to the flame mixing zone of the combustor. In some embodiments, this can entail adding the NOx through a dedicated line directly into the combustor. In other embodiments, this can entail adding the NOx through a union, valve, or the like into a further input line directly upstream from the combustor. Moreover, this can include configurations wherein the combustor includes one or more nozzles or the like that are configured for catalyst ingress directly at the flame mixing zone.

In one or more embodiments, the present disclosure further can include means to remove NOx at the back end of the cycle, such as in the processes otherwise described above. For example, separator 150 can be configured for removal of NOx through reaction with one or both of SOx and water and/or through addition of one or more oxidizing components, particularly materials recognized as advanced oxidants (e.g., peroxide, a superoxide, ozone, and/or a halo-oxide). In addition, the NOx injection preferably is controlled in a manner such that the NOx may not only be injected at any point in the cycle but also may be adjusted as needed so that the local NOx concentration can be carefully elevated and easily turned down when no longer required to catalyze flame control. As such, NOx species, and particularly NO, can be provided in any of the following manners or combinations thereof: injected directly into a combustor or combustion chamber; mixed with a fuel stream entering a combustor or combustion chamber; mixed with an oxidant stream entering a combustor or combustion chamber; mixed with a diluent stream (e.g., a $CO_2$ stream) entering a combustor or combustion chamber; mixed with a working fluid stream entering a combustor or combustion chamber; mixed with a water or steam stream entering a combustor or combustion chamber; mixed with a cooling stream entering a combustor or combustion chamber.

An oxyfuel combustion cycle suitable for use according to one or more embodiments of the present disclosure can further include a variety of components suitable for carrying out a power production method. Example embodiments of system and method components that may be implemented with the present disclosure are provided in U.S. Pat. Nos. 8,596,075, 8,776,532, 8,869,889, 8,959,887, 8,986,002, 9,062,608, 9,068,743, 9,410,481, 9,416,728, 9,546,815, 10,018,115, U.S. Pub. No. 2012/0067054, and U.S. Pub. No. 2018/0133647, the disclosures of which are incorporated herein by reference.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A method for propagating flame in a combustor of a power production plant, the method comprising:
   inputting to a combustor a fuel having an autoignition temperature;
   further inputting to the combustor at least one non-fuel stream; and
   heating the at least one non-fuel stream sufficiently such that a total flow of streams entering the combustor is at a temperature that is greater than the autoignition temperature of the fuel, the heating being effective to propagate flame in the combustor;
   wherein heating the at least one non-fuel stream is carried out only before inputting the at least one non-fuel stream to the combustor and by utilizing only heat that is not derived from combustion.

2. The method of claim 1, wherein the method is implemented at start-up of the power production plant or during a transient period in operation of the power production plant.

3. The method of claim 2, wherein the start-up of the power production plant or the transient period in operation of the power production plant is defined in relation to the power production plant operating at a power output that is less than 75% of a normal operating power output.

4. The method of claim 1, wherein one or both of the following conditions applies:
   the non-fuel stream is one or more of an oxidant stream, a working fluid stream, a diluent stream, and a water/steam stream;
   heating the at least one non-fuel stream comprises heating at least a portion of a line through which the non-fuel stream flows to the combustor using one or more line heaters.

5. The method of claim 1, wherein heating the at least one non-fuel stream comprises heating at least a portion of a line through which the non-fuel stream flows to the combustor using one or more line heaters.

6. The method of claim 5, wherein the one or more line heaters is configured to receive a heated stream for transfer of heat therefrom to the line.

7. The method of claim 1, wherein heating the at least one non-fuel stream comprises directly heating the at least one non-fuel stream.

8. The method of claim 7, wherein directly heating the at least one non-fuel stream comprises compressing the at least one non-fuel stream.

9. The method of claim 1, wherein heating the at least one non-fuel stream comprises passing the at least one non-fuel stream through a heat exchanger against a separately heated stream.

10. The method of claim 1, wherein the at least one non-fuel stream is input to the combustor through a line that includes a branch line that is isolatable from the line.

11. The method of claim 10, wherein heating the at least one non-fuel stream comprises heating at least a portion of the branch line.

12. The method of claim 10, wherein the branch line is isolatable from the line utilizing one or more valves that selectively allow or disallow flow of the at least one non-fuel stream through the branch line.

13. The method of claim 1, further comprising inputting a chemical catalyst comprising at least one NOx species into the combustor in an amount sufficient to reduce an activation energy level necessary to achieve or maintain flame in the combustor or a combustion chamber thereof.

14. A power production plant comprising:
a combustor with a flame zone;
a fuel line configured for input to the combustor of a fuel having an autoignition temperature;
at least one input line configured to deliver to the combustor at least one non-fuel stream;
a turbine or expander in fluid communication with the combustor; and
at least one heater operably arranged with the at least one input line to heat the at least one non-fuel stream before passage into the combustor sufficiently such that a total flow of streams entering the combustor is at a temperature that is greater than the autoignition temperature of the fuel, the heating being effective to propagate a flame in the flame zone of the combustor.

15. The power production plant of claim 14, wherein the at least one heater is a line heater that is optionally configured to receive a heated stream for transfer of heat therefrom to the line.

16. The power production plant of claim 14, wherein one or both of the following conditions are met:
the at least one heater comprises a compressor;
the at least one heater comprises a heat exchanger through which the at least one none-fuel stream is heatable against a heated stream.

17. The power production plant of claim 14, wherein the at least one input line further includes a branch line that is isolatable from the at least one input line, and wherein the at least one heater is positioned on the branch line.

18. The power production plant of claim 17, wherein the branch line is isolatable from the at least one input line utilizing one or more valves that selectively allow or disallow flow of the at least one non-fuel stream through the branch line.

19. A method for propagating flame in a combustor of a power production plant, the method comprising:
inputting a fuel into a combustor;
inputting an oxidant into the combustor; and
inputting a chemical catalyst comprising at least one NOx species into the combustor in an amount sufficient to reduce an activation energy level necessary to achieve or maintain flame in the combustor or a combustion chamber thereof.

20. The method of claim 19, wherein one or more of the following conditions is met:
the chemical catalyst comprising at least one NOx species is input to the combustor in combination with one or both of the fuel and the oxidant;
the method further comprises reacting at least ammonia in a reactor to generate the at least one NOx species;
the inputting of the chemical catalyst comprising at least one NOx species is substantially continuous during operation of the power production plant, and wherein the method further comprises adjusting a content of the chemical catalyst comprising the at least one NOx species based upon a change in one or more further operating parameters of the power production plant;
the chemical catalyst comprising at least one NOx species is input in an amount sufficient such that an amount of the at least one NOx species present in an exhaust flow out of the combustor is about 5 ppm to about 1000 ppm;
the inputting of the chemical catalyst comprising at least one NOx species is carried out until a defined threshold is reached, the defined threshold optionally being a combustor operating temperature or a power output of the power production plant.

21. A method for propagating flame in a combustor of a power production plant, the method comprising:
inputting to a combustor a fuel having an autoignition temperature;
further inputting to the combustor at least one non-fuel stream;
heating the at least one non-fuel stream sufficiently such that a total flow of streams entering the combustor is at a temperature that is greater than the autoignition temperature of the fuel or is below the autoignition temperature of the fuel by no more than 20%, the heating being effective to propagate flame in the combustor; and
controllably operating a heating component present within the combustor or a combustion chamber thereof;
wherein heating the at least one non-fuel stream is carried out utilizing heat that is not derived from combustion.

22. The method of claim 21, wherein the heating of the at least one non-fuel stream is at least partially carried out in the heating component that is present within the combustor or a combustion chamber thereof.

23. The method of claim 21, wherein the heating component is controlled so when the total flow of streams entering the combustor is at a temperature that is below the autoignition temperature of the fuel, the heating component is effective to add sufficient heat so that an overall temperature in the combustor or the combustion chamber is greater than the autoignition temperature of the fuel.

24. A power production plant comprising:
a combustor with a flame zone;
a fuel line configured for input to the combustor of a fuel having an autoignition temperature;
at least one input line configured to deliver to the combustor at least one non-fuel stream;
a turbine or expander in fluid communication with the combustor;
at least one heater operably arranged with the at least one input line to heat the at least one non-fuel stream sufficiently such that a total flow of streams entering the combustor is at a temperature that is greater than the autoignition temperature of the fuel or is below the autoignition temperature of the fuel by no more than 20%, the heating being effective to propagate a flame in the flame zone of the combustor; and
a heating component positioned within the combustor or within a combustion chamber thereof.

25. The power production plant of claim 24, wherein one or more of the following conditions is met:

the heating component is configured to provide heating to the combustor or the combustion chamber that is independent of heating from the total flow of streams entering the combustor;

the heating component is a resistive heater;

the heating component is controllable so when the total flow of streams entering the combustor is at a temperature that is below the autoignition temperature of the fuel, the heating component is effective to add sufficient heat so that an overall temperature in the combustor is greater than the autoignition temperature of the fuel.

\* \* \* \* \*